(12) United States Patent
Tice

(10) Patent No.: US 6,250,221 B1
(45) Date of Patent: Jun. 26, 2001

(54) IMAGING SYSTEM HAVING EXTERNAL DRUM AND METHOD FOR PRODUCING DRUM

(75) Inventor: William W. Tice, Amherst, NH (US)

(73) Assignee: Agfa Corporation, Wilmington, MA (US)

( * ) Notice: Subject to any disclaimer, the term of this patent is extended or adjusted under 35 U.S.C. 154(b) by 0 days.

(21) Appl. No.: 09/395,586

(22) Filed: Sep. 14, 1999

(51) Int. Cl.⁷ .............................. F16C 13/00; B21D 51/10
(52) U.S. Cl. .................... 101/246; 101/375; 101/409; 492/25; 492/58; 29/895; 29/895.33
(58) Field of Search .................................. 101/246, 375, 101/376, 409, 415.1, DIG. 39, 407.1, 368, 216; 492/16, 17, 18, 25, 22, 38, 57, 58; 29/895, 895.3, 895.33

(56) References Cited

U.S. PATENT DOCUMENTS

| | | | |
|---|---|---|---|
| 2,378,478 | * 6/1945 | Harless | 101/409 |
| 4,453,848 | * 6/1984 | Adkisson et al. | 400/661 |
| 4,778,290 | * 10/1988 | Costa et al. | 400/208 |
| 4,856,428 | * 8/1989 | Green et al. | 101/475 |
| 6,154,626 | * 11/2000 | Litman et al. | 399/282 |

\* cited by examiner

Primary Examiner—John S. Hilten
Assistant Examiner—Leslie J. Grohusky
(74) Attorney, Agent, or Firm—John A. Merecki; Robert A. Sabourin

(57) ABSTRACT

The present invention provides an extruded external drum for an imaging system. The external drum is extruded from a light-weight and strong material such as an aluminum alloy. The external drum includes a thin outer wall, a hollow cylindrical hub, and a plurality of thin radial spokes extending between the cylindrical hub and the outer wall. The present invention provides a stiff external drum having low rotational inertia.

21 Claims, 4 Drawing Sheets

IMAGING SYSTEM HAVING EXTERNAL DRUM AND METHOD FOR PRODUCING DRUM

FIELD OF THE INVENTION

The present invention is in the field of imaging systems. More particularly, the present invention provides an external drum imaging system including a one-piece, low inertia, external drum formed using an extrusion process.

BACKGROUND OF THE INVENTION

In many imaging systems, such as imagesetters or platesetters, a movable optical carriage is used to displace a laser system or other imaging source in a slow scan direction along a stationary or moving, curved or planar, media support surface (e.g., external drum, internal drum, flatbed, or other support surface). The imaging source exposes a supply of recording media supported on, and held against, the media support surface. Generally, the imaging source includes an optical system for scanning one or more laser or other radiation beams, each modulated by a digital information signal, over the recording media to record an image onto the recording media.

For example, in an external drum imaging system, the information signal is recorded onto a supply of recording media mounted about the external drum by displacing the imaging source relative to the external drum. This may be accomplished in a number of ways, including a rotation of the external drum in combination with a lateral translation of the imaging source, a rotation and translation of the external drum past a stationary imaging source, etc. Generally, for system compactness, the external drum is rotated while the imaging source is displaced in discrete steps or continuously along the length of the external drum to record data onto the recording media.

The recording media to be imaged by an imaging system is commonly supplied in web form or in discrete sheets or plates. The recording media may include a photosensitive, radiation sensitive, thermally sensitive, or other type of imageable material.

The throughput of an external drum imaging system (e.g., the number of plates/hour that can be imaged by the system) is dependent upon a multitude of factors. For example, the time required for a stationary external drum to be rotated up to the speed required for imaging (e.g., 100–1000 revolutions per minute (rpm)), or conversely, the time required to bring a rotating external drum to a stop to remove imaged recording media and then load new recording media, greatly affects the throughput of the imaging system. The throughput of the imaging system may be increased, therefore, by increasing the rotational (angular) acceleration/deceleration of the external drum. Heretofore, increased angular acceleration/deceleration of the external drum has been achieved using larger and more powerful drive motors, power supplies, braking systems, etc. Unfortunately, although quite effective, the use of such systems greatly increases the complexity, cost, size, etc., of the imaging system.

SUMMARY OF THE INVENTION

In order to overcome the deficiencies of currently available external drum imaging systems, the present invention provides an external drum imaging system including a one-piece, low inertia, external drum formed using an extrusion process.

Generally, in accordance with a preferred embodiment, the present invention provides an apparatus comprising: an extruded external drum for an imaging system. Preferably, the external drum is extruded from a light-weight and strong material such as an aluminum alloy. The external drum preferably includes a thin outer wall, a hollow cylindrical hub, and a plurality of thin radial spokes extending between the cylindrical hub and the outer wall. Advantageously, the present invention provides a stiff external drum having low rotational inertia.

The present invention additionally provides an external drum for an imaging system, comprising: an outer wall; a hub; and a plurality of radial spokes extending between the hub and the outer wall, the outer wall including a section for receiving a clamp for securing a supply of recording media about the external drum, and an opposing section, having increased mass, for rotationally balancing the clamp.

The present invention additionally provides an imaging system comprising: an external drum for supporting a supply of recording media, the external drum including an outer wall, a hub, and a plurality of radial spokes extending between the hub and the outer wall; and a system for recording image data onto the recording media.

The present invention additionally provides a method for producing an external drum for an imaging system, comprising the steps of: providing a supply of a material; and extruding the material through a die to form the external drum.

BRIEF DESCRIPTION OF THE DRAWINGS

The features of the present invention will best be understood from a detailed description of the invention and a preferred embodiment thereof selected for the purposes of illustration and shown in the accompanying drawings in which.

DETAILED DESCRIPTION OF THE INVENTION

Figure 1:
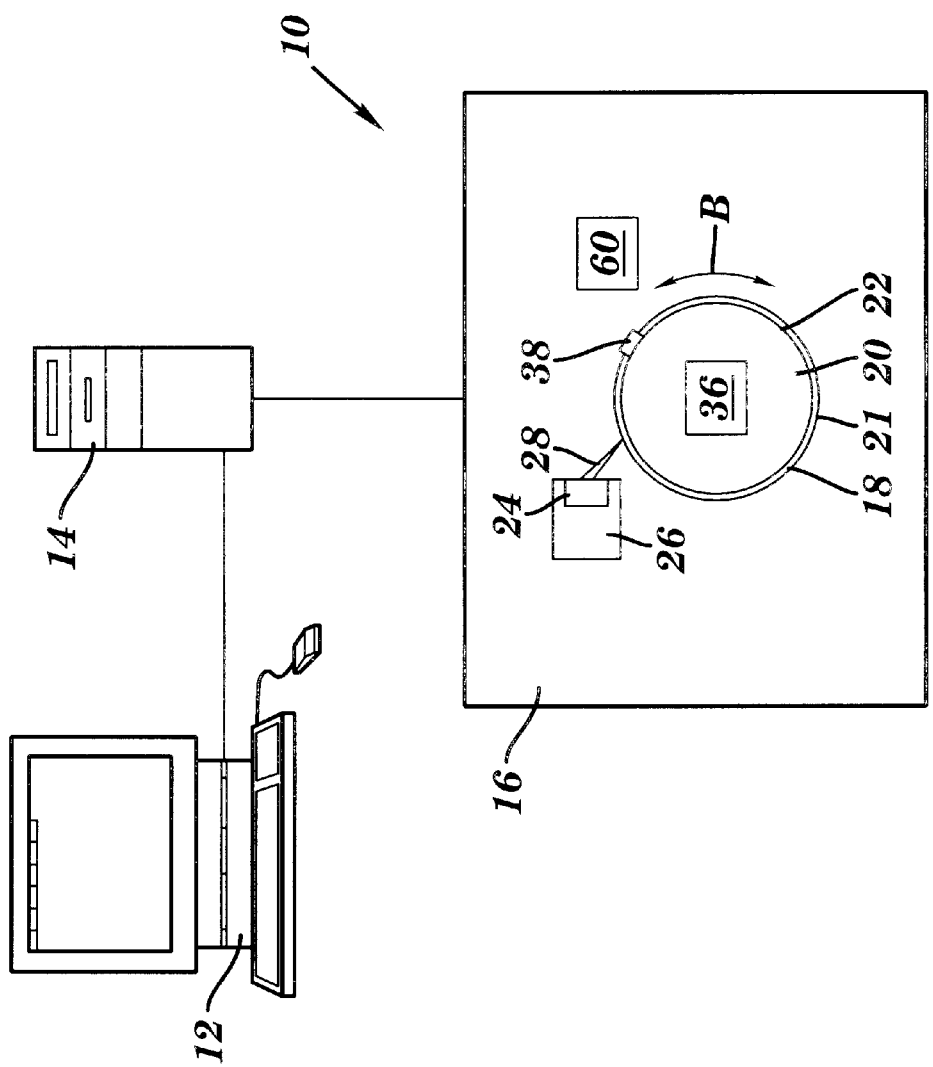
FIG. 1 illustrates an external drum imaging system for recording images onto a supply of recording media.

The features and advantages of the present invention are illustrated in detail in the accompanying drawings, wherein like reference numerals refer to like elements throughout the drawings. Although the drawings are intended to illustrate the present invention, the drawings are not necessarily drawn to scale.

An example of an imaging system 10 is illustrated in FIG. 1. In this example, the imaging system 10 includes an external drum imagesetter configured to record digital data onto a supply of film, a printing plate, or other recording media. Although described below with regard to an external drum imagesetter, the present invention may be used in conjunction with a wide variety of other types of external drum imaging systems, including platesetters and the like, without departing from the intended scope of the present invention as set forth in the claims.

The imaging system 10 generally includes a front end computer or workstation 12 for the design and layout of pages to be printed, a raster image processor (RIP) 14 for rasterizing the page data, and an imagesetter 16. The imagesetter 16 records the digital data provided by the RIP 14 onto a supply of photosensitive, radiation sensitive, thermally sensitive, or other type of suitable recording media 18. The recording media 18 is provided in web form or in discrete sheets or plates by a media supply system 60.

Figure 2:
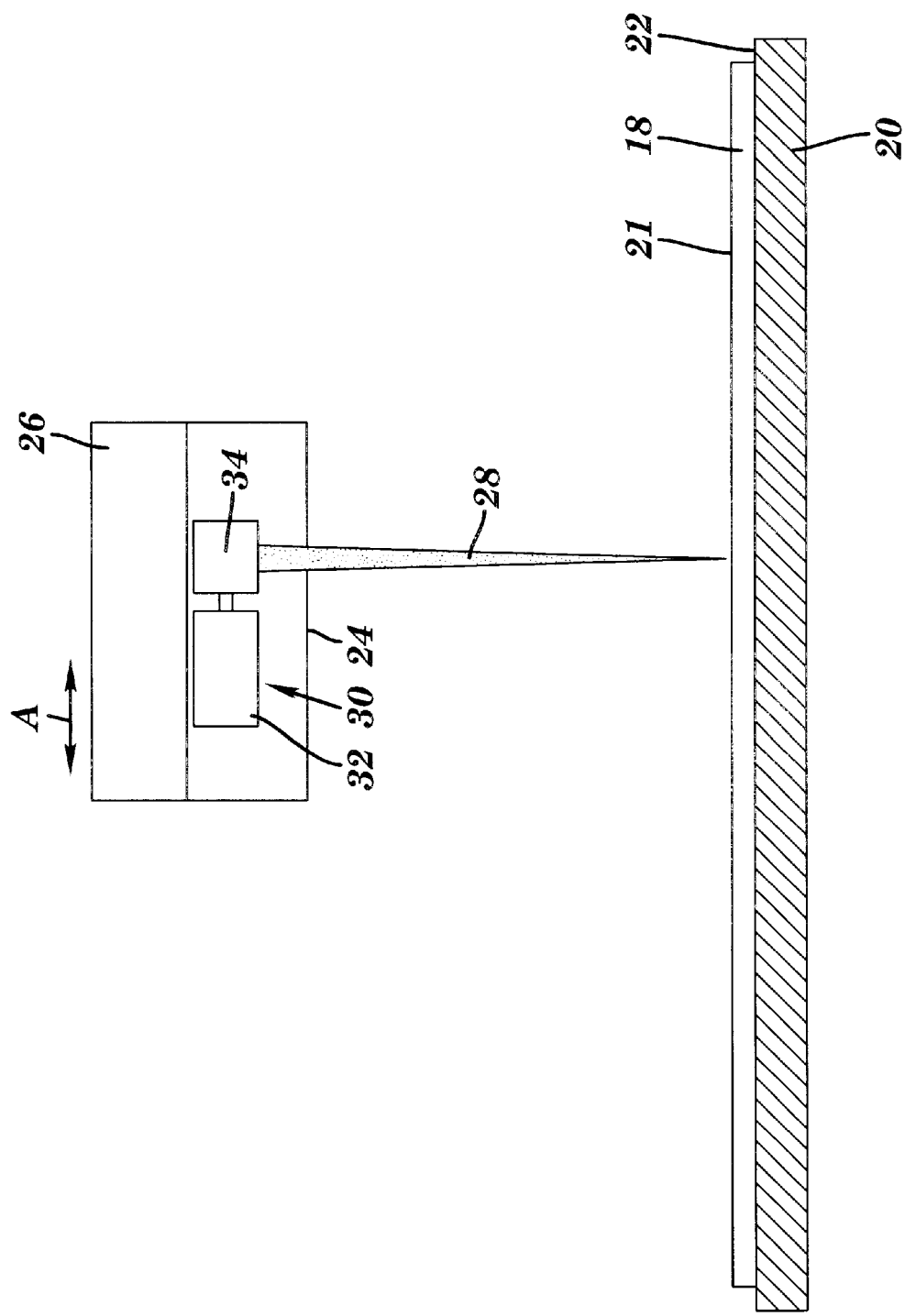
FIG. 2 illustrates the movable optical carriage and scanning system of the imaging system of FIG. 1.

The imagesetter 16 includes an external drum 20 having a cylindrical media support surface 22 for supporting the recording media 18 during imaging. The image setter 16 further includes a scanning system 24, carried by a movable optical carriage 26, for recording digital data onto the imaging surface 21 of the recording media 18 using a single or multiple imaging beams 28. As illustrated in FIG. 2, the scanning system 24 is displaced by the movable optical carriage 26 in a slow scan axial direction (directional arrow A) along the length of the rotating external drum 20 to expose the recording media 18 in a line-wise or section-wise manner. The external drum 20 is rotated by a drive system 36 in a clockwise or counterclockwise direction as indicated by directional arrow B in FIG. 1. Typically, the drive system 36 rotates the external drum 20 at a rate of about 100–1000 rpm.

As further illustrated in FIG. 2, the scanning system 24 typically includes a system 30 for generating the imaging beam 28. The system 30 includes a light or radiation source 32 for producing the imaging beam 28, and an optical system 34 positioned between the radiation source 32 and the media support surface 22 for focusing the imaging beam 28 onto the recording media 18. It should be noted, however, that the system 30 described above is only one of many different types of scanning systems that may be used to record image data on the recording media 18.

In the imaging system 10, at least one end (e.g., the leading or trailing end) of the recording media 18 is held in position against the media support surface 22 by a clamping mechanism 38. Alternately, or in addition, a vacuum source (not shown) may be used to draw a vacuum through a plurality of vacuum ports/grooves in the media support surface 22 to hold the recording media against the media support surface 22. A registration system, comprising, for example, a set of registration pins or stops on the external drum 20, and corresponding registration holes or notches in the recording media 18, may be used to accurately register the recording media 18 on the external drum 20.

Figure 3:
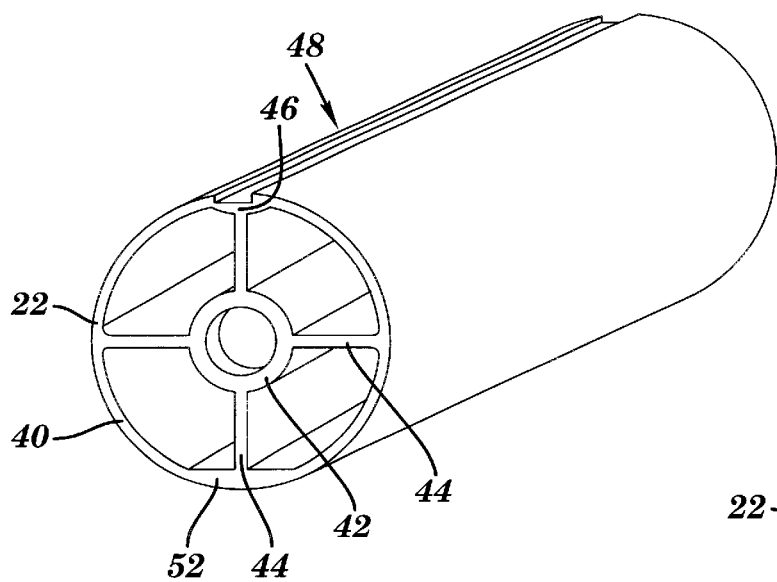
FIG. 3 is a perspective view of the external drum of the imaging system of FIG. 1, in accordance with the preferred embodiment of the present invention
Figure 4:
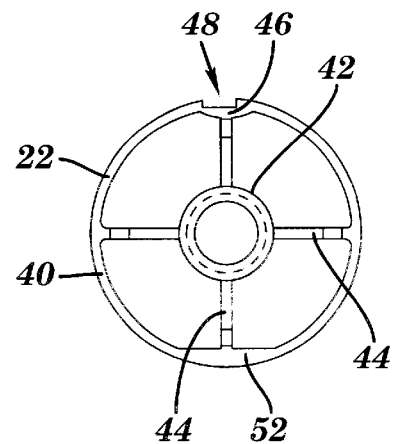
FIG. 4 is an end view of the external drum of FIG. 3.
Figure 5:
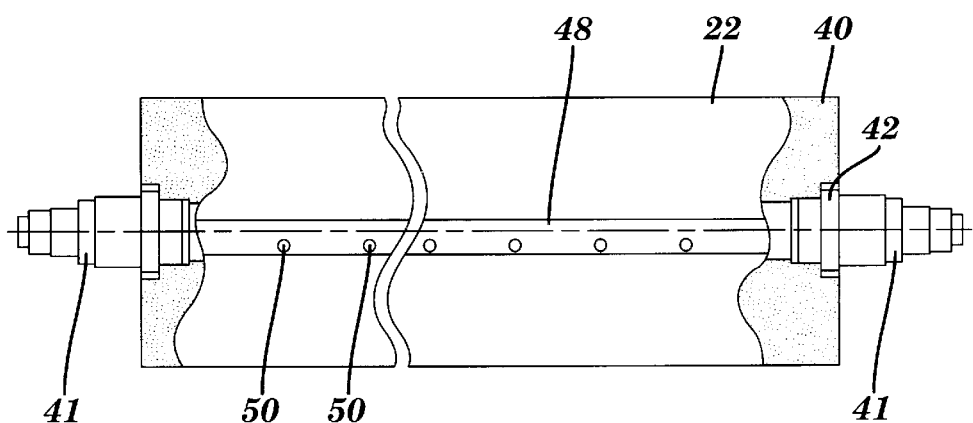
FIG. 5 is a plan view of the external drum of FIG. 3.

A perspective view of the external drum 20 in accordance with the preferred embodiment of the present invention is illustrated in FIG. 3. An end view and a plan view of the external drum 20 are illustrated in FIGS. 4 and 5, respectively. As shown, the external drum 20 preferably includes an outer wall 40 including the media support surface 22, a hollow cylindrical hub 42, and a plurality of radial spokes 44 extending between the cylindrical hub 42 and the outer wall 40. The external drum 20 is rotated the drive system 36 via shafts 41 coupled to the ends of the hub 42.

The external drum 20 is preferably formed in a single piece using an extrusion process from a lightweight and strong material such as an aluminum alloy. Suitable aluminum alloys may include, for example, aluminum alloy 6063–T5. Other aluminum alloys, or alloys formed of metals other than aluminum, that can be suitably extruded, may also be used to form the external drum 20.

The present invention provides a stiff external drum 20 having low rotational inertia. The radial stiffness of the external drum 20 is provided by a combination of the wall thickness of the hub 42, the thickness of the spokes 44, the diameter of the shafts 41, and the thickness of the outer wall 40. The torsional stiffness of the external drum 20 is primarily provided by the thickness of the spokes 44 and the diameter of the shafts 41. In the present invention, the relative thicknesses and dimensions of the components of the external drum 20 have been optimized to provide radial and torsional stiffness suitable for an external drum imaging application, and the lowest possible rotational inertia. As a result of this design, more of the mass of the external drum 20 is located in the hub 42 and spokes 44. The spokes 44 may be also be tapered with more mass located near the hub 42. By forming the external drum 20 in this manner, i.e., by minimizing the rotational inertia of the external drum 20, the external drum 20 can be accelerated and decelerated more rapidly, using smaller and less expensive motors, power supplies, etc., thereby increasing the throughput of the imaging system 10.

The outer wall 40 of the external drum 20 further includes a section 46 containing a groove 48 that provides an interface for the clamping mechanism 38. The clamping mechanism 38 is attached within the groove 48 by inserting and securing suitable mounting hardware (e.g., bolts, etc.) through the clamping mechanism 38 and corresponding apertures 50 formed in the bottom of the groove 48. Other techniques for attaching the clamping mechanism 38 to the external drum 20 may also be used. In the preferred embodiment of the present invention, the groove 48 is disposed above one of the radial spokes 44. The relative thickness of the outer wall 40 is increased below the groove 48 to maintain minimum wall thickness requirements. By forming the groove 48 in this location, the stiffness and strength of the external drum 20 are not compromised. The groove 48 may be formed as part of the extrusion process, and/or may be machined into the external drum 20 after extrusion.

To compensate for the weight of clamping mechanism 38, thereby balancing the external drum 20 during rotation, the section 52 of the drum opposite the groove 48 is provided with extra material (i.e., extra mass). This is achieved by increasing the extruded thickness of the outer wall 40 opposite the groove 48. Thus, the present invention nominally and inexpensively balances the external drum 20 and clamping mechanism 38 by adding extruded material opposite the clamping mechanism. Proper balancing of the external drum 20 helps to prevent the introduction of vibration-induced artifacts into the images recorded on the recording media 18 by the imaging system 10.

Figure 7:
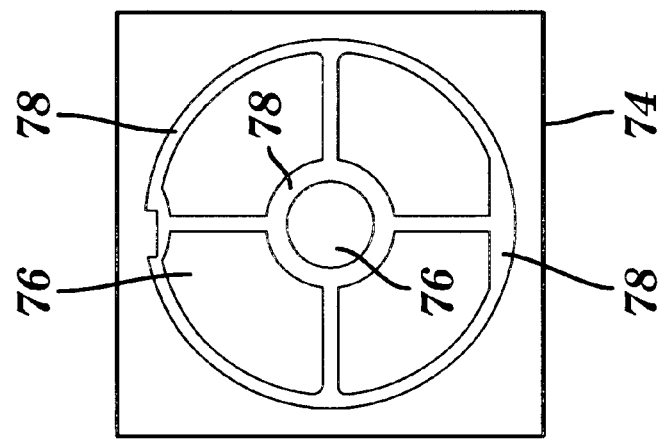
FIG. 7 is an end view of a die for extruding the external drum of FIG. 3.
Figure 6:
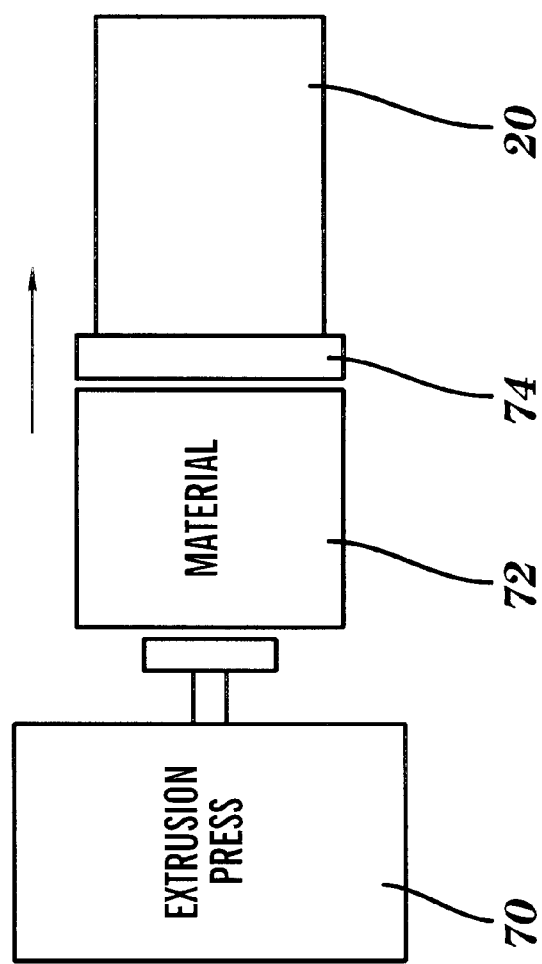
FIG. 6 illustrates the extrusion process for producing the external drum of FIG. 3.

The extrusion process for producing the external drum 20 is illustrated in FIG. 6. As shown, an extrusion press 70 is used to force a billet 72 of material (e.g., a billet of an aluminum alloy) through a suitably designed die 74. A simplified end view of the die 74 is illustrated in FIG. 7. Generally, the die 74 includes solid areas 76 corresponding to the hollow sections of the extruded external drum 20, and hollow areas 78 corresponding to the solid sections of the extruded external drum 20. As the material is forced into and through the die 74, a length of a product or external drum 20 is produced. The product 20 is then cut to length to form an unfinished external drum. Subsequent machining of the unfinished external drum results in the external drum 20. External drums of varying length can easily be produced by cutting the product 20 to the desired length.

The foregoing description of the present invention has been presented for purposes of illustration and description.

It is not intended to be exhaustive or to limit the invention to the precise form disclosed, and many modifications and variations are possible in light of the above teaching. Such modifications and variations that may be apparent to a person skilled in the art are intended to be included within the scope of this invention as defined by the accompanying claims.

What is claimed is:

1. An apparatus comprising:
    an extruded external drum for an imaging system, the external drum including an outer wall, a hub, and a plurality of radial spokes extending between the hub and the outer wall, the outer wall further including a first section for receiving a clamp for securing a supply of recording media about the external drum, and a second, opposing section, having increased mass, for rotationally balancing the clamp.

2. The apparatus according to claim 1, wherein the external drum is formed from an aluminum alloy.

3. The apparatus according to claim 1, wherein the first section for receiving a clamp comprises a groove in the outer wall.

4. The apparatus according to claim 3, wherein the groove is disposed above one of the radial spokes.

5. The apparatus according to claim 1, wherein the second, opposing section comprises an increased, extruded thickness of the outer wall.

6. The apparatus according to claim 5, wherein the second, opposing section is disposed above one of the radial spokes.

7. An external drum for an imaging system, comprising:
    an outer wall;
    a hub; and
    a plurality of radial spokes extending between the hub and the outer wall, the outer wall including a section for receiving a clamp for securing a supply of recording media about the external drum, and an opposing section, having increased mass, for rotationally balancing the clamp.

8. The external drum according to claim 7, wherein the external drum is extruded from an aluminum alloy.

9. The external drum according to claim 7, wherein the section for receiving a clamp comprises a groove in the outer wall.

10. The external drum according to claim 9, wherein the groove is disposed above one of the radial spokes.

11. The external drum according to claim 7, wherein the opposing section comprises an increased thickness of the outer wall.

12. The external drum according to claim 11, wherein the opposing section is disposed above one of the radial spokes.

13. An imaging system comprising:
    an external drum for supporting a supply of recording media, the external drum including an outer wall, a hub, and a plurality of radial spokes extending between the hub and the outer wall, the outer wall further including a section for receiving a clamp for securing the recording media about the external drum, and an opposing section, having increased mass, for rotationally balancing the clamp; and
    a system for recording image data onto the recording media.

14. The imaging system according to claim 13, wherein the external drum is extruded from an aluminum alloy.

15. The imaging system according to claim 13, wherein the section for receiving a clamp comprises a groove in the outer wall.

16. The imaging system according to claim 15, wherein the groove is disposed above one of the radial spokes.

17. The imaging system according to claim 13, wherein the opposing section comprises an increased thickness of the outer wall.

18. The imaging system according to claim 17, wherein the opposing section is disposed above one of the radial spokes.

19. A method for producing an external drum for an imaging system, comprising the steps of:
    providing a supply of a material;
    extruding the material through a die to form the external drum, the external drum including an outer wall, a hub, and a plurality of radial spokes extending between the hub and the outer wall;
    forming a groove for a clamping mechanism in the outer wall; and
    increasing a mass of the outer wall opposite the groove to rotationally balance the external drum.

20. The method according to claim 19, wherein the material comprises an aluminum alloy.

21. The method according to claim 19, wherein step of increasing the mass includes the step of increasing an extruded thickness of the outer wall.

* * * * *